United States Patent [19]

Vary et al.

[11] Patent Number: 4,607,362

[45] Date of Patent: Aug. 19, 1986

[54] METHOD OF AND CIRCUIT ARRANGEMENT FOR ESTABLISHING CONFERENCE CONNECTIONS IN A SWITCHING SYSTEM

[75] Inventors: Peter Vary, Herzogenaurach; Rudolf Hofmann, Forchheim; Karl Hellwig, Wonfurt, all of Fed. Rep. of Germany

[73] Assignee: U.S. Philips Corporation, New York, N.Y.

[21] Appl. No.: 642,621

[22] Filed: Aug. 20, 1984

[30] Foreign Application Priority Data

Aug. 18, 1983 [DE] Fed. Rep. of Germany ....... 3329779

[51] Int. Cl.[4] ............................................ H04Q 11/04
[52] U.S. Cl. ................................. 370/62; 179/18 BC
[58] Field of Search ...................... 370/62; 179/18 BC

[56] References Cited

U.S. PATENT DOCUMENTS

| Re. 31,814 | 1/1985 | Lubin | 370/62 |
|---|---|---|---|
| 4,054,755 | 10/1977 | Lee et al. | 179/18 BC |
| 4,126,766 | 11/1978 | McLaughlin et al. | 179/18 BC |
| 4,254,497 | 3/1981 | Funderburk et al. | 370/62 |
| 4,274,155 | 6/1981 | Funderburk et al. | 370/62 |
| 4,316,059 | 2/1982 | Toth | 179/18 BC |
| 4,387,457 | 6/1983 | Münter | 179/18 BC |
| 4,388,717 | 6/1983 | Burke | 179/18 BC |
| 4,482,998 | 11/1984 | Marouf et al. | 179/18 BC |
| 4,488,291 | 12/1984 | Eschmann et al. | 179/18 BC |
| 4,499,578 | 2/1985 | Marouf et al. | 370/62 |

*Primary Examiner*—Douglas W. Olms
*Assistant Examiner*—Kenneth I. Rokoff
*Attorney, Agent, or Firm*—Thomas A. Briody; William J. Streeter; Leroy Eason

[57] ABSTRACT

During algebraic summing of code words from conference participants to form a partial sum-code word overflow of the values may occur. Such an overflow can be prevented when prior to the adding operations the numerical range is extended and an adjustment of weighting factors is effected in dependence on the measured speech intensity of the partial sum-code word. By multiplying by these (attenuation) factors the outgoing subscriber-code word is mapped again on the original numerical range in the attenuation circuit. To reduce a noise level originating, for example, from line interferences, quantization errors, etc. subscribers which are currently not speaking can be attenuated in a further attenuation control circuit of the conference arrangement.

21 Claims, 8 Drawing Figures

METHOD OF AND CIRCUIT ARRANGEMENT FOR ESTABLISHING CONFERENCE CONNECTIONS IN A SWITCHING SYSTEM

The invention relates to a method of establishing conference connections in a switching system as described in the introductory parts of claims 1 and 2.

EP No. 0,005,833 discloses a method and a circuit arrangement for establishing conference connections in a PCM-time division multiplex switching system. During each pulse frame the compressed PCM-words received from the participants in the conference are linearised. The PCM-words are intermediately stored in a conference store and sub-total code words are formed from the intermediately stored PCM words of the participants. The sub-total code word is read at the occurrence of a new PCM-word received from a participant in the conference. The specific PCM-word is added thereto and the new sub-total code word is again intermediately stored in the conference store. After the current pulse frame has ended, a so-called total sum-code word is contained in the intermediate store as a result of this progressive algebraic summing operation. Final sum-code words which do not contain the sum portion of their own speech signal are transmitted to the conference participants in the subsequent pulse frame. To that end the PCM-words received in the specific time channel of the participants are subtracted from the total sum-code-word. Prior to transmission, the final sum-code words are delinearised to form compressed PCM-words.

In a conference connection the speech signals of all the other persons participating in the conference are transmitted to a conference participant. For that purpose an individual partial sum of all the received speech signals associated with the conference mode is formed for each conference participant without the portion of his own speech signal. When the speech signals are available as digital code words (for example source coding) no unlimited addition is possible because of the limited stock of values. The numerical range which can be represented, is, for example, standardized to values between $-1 \leq u(kT) < +1$, wherein $u(kT)$ is a symbol representing a sampling value at the instant kT and T is a symbol representing the length of a sampling period. During a speech phase in which two or more conference participants are actually speaking, it may happen that during summing of all the digital code words the representable numerical range is exceeded, for example beyond the value +1. As, however, this value cannot be represented, the total sum results in this case in a negative numerical value (effect of the "numerical circle"). After the digital code word has been converted into an analog signal such errors become evident as distortions of the speech signal.

The DE-OS No. 31 47 492 discloses a circuit arrangement for establishing conference connections in a PCM-time-division multiplex switching system. Therein, linearised PCM words are each one multiplied by an attenuation factor before they are stored in a read-only memory. The attenuation factors depend on the respective attenuation ratios of connecting line are determined before, for example, a PCM branch station is put into operation and are permanently fixed. The established attenuation factor is listed in a PCM table which is used to convert the numerical value from the logarithmic to the linear representation. Because of the presence of a fixed attenuation factor, low-voiced and loud-voiced speakers (conference participants) cannot be distinguished from each other, so that distortions of the speech signal occur when several conference participants speak simultaneously.

The invention has for its object to elaborate a method known from the EP No. 0 005 833 in such a way that during the conference mode, distortion of the speech signals—because of the fact that the representable numerical range is exceeded during the calculation of the final sum-code word of all the conference participants—is avoided to a significant extent.

In the first embodiment the weighting factors are adjusted before the multiplicative processing, taking speech intensity into account, that no overflow occurs during the formation of the final sum-code words.

In the second embodiment the most significant subscriber code words are applied to a processing circuit for forming partial sums, this processing circuit being connected to an attenuation control circuit. Extending the numerical range (for example from 12 bits to 16 bits) prevents overflow during the formation of the partial sums. Before the partial sums are transmitted to the conference participant the attenuation control circuit provides (by means of attenuation factors) that the partial sums are again included within the original numerical range. As a control circuit has inter alia a time delay, a limiter arranged in the attenuation control circuit ensures that the permissible numerical range is respected. Clipped signal peaks are much less audible than overflow. The attenuation of non-speaking conference participants provides that interferences produced, for example, by line or ambient noise are reduced to a non-annoying level. To reduce the overall cost of the circuit this attenuation of subscriber signals may alternatively be omitted, so that the subscriber code words are directly applied to the processing circuit.

The invention will now be described in greater detail by way of example with reference to the embodiments shown in the drawing. Therein:

Figure 1:
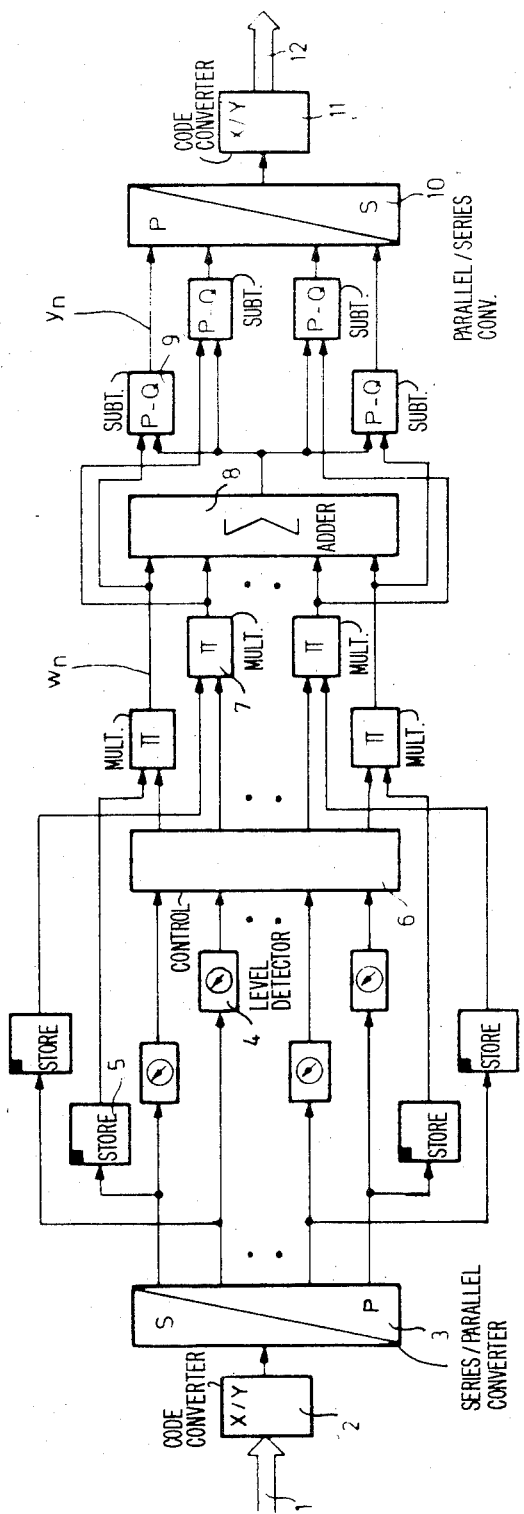
FIG. 1 is a circuit diagram of a first embodiment according to the invention.

FIG. 1 is a block diagram of a circuit arrangement for establishing conference connections at a telephone exchange. The speech signals coming from the subscriber devices (not shown in the drawing) are subjected to an A/D conversion. Subsequent thereto sampling values of the signals are converted into a code which is adapted to the transmission properties of the transmission channel, for example a PCM-code with a logarithmic characteristic. These PCM-words can be combined at the receiver end, for example in a PCM-multiplexing device, to form a data stream of PCM-words and be applied to a conference arrangement via a bus line 1. Preferably, the N code words of the participants in a conference are accomodated in the first N time slots within a pulse frame. To avoid errors in the algebraic summing of subscriber codewords (due to the non-linear encoding characteristic) it is necessary to linearise the incoming code words. This function is performed by a code converter 2.

A series-parallel converter 3 connected to the code converter 2 provides distribution of the data stream over real time channels of the conference participants. Each output of the series-parallel converter is connected to a store 5 in which the subscriber code word is stored in a linear code (intermediate storage). To measure the voice intensity of the input signal by means of a measuring device 4, each output of the series-parallel converter 3 is connected to said device. To measure the voice intensity, a level criterion or a power criterion may, for example, be utilised. A control arrangement 6 calculates weighting factors from the comparison between the voice-intensities measured of all the conference participants. The intermediately stored code words are weighted with the weighting factor before partial sums are formed with the aid of multiplier 7.

The final sums are formed such that the weighted code words of all the other conference participants are transmitted to each participant. To prevent the participant from hearing himself (the occurrence of an echo in the event of long signal group delay times) the participant's own speech signal is not taken into account during the sum formation. To that end, in the first embodiment all the weighted subscriber code words are added together in an adder 8 to form a final sum-code word. Forming the code-word to be transmitted to the conference participant is effected in subtractors 9 by subtracting the weighted subscriber code word.

In a parallel-series converter 10 connected to the subtractor 9 the subscriber code words to be transmitted are inserted again into the serial data stream and transmitted via a bus 12. Compressed encoding is effected in a converter 11 before transmission.

Figure 2:
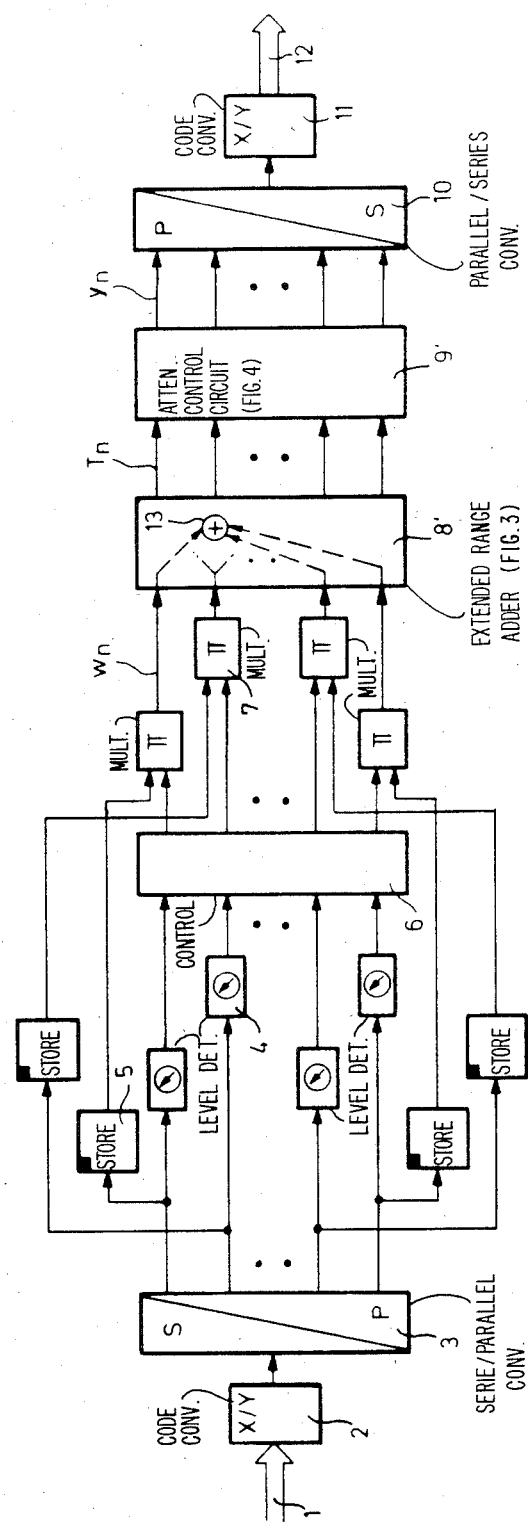
FIG. 2 is a block circuit of a second embodiment of the conference arrangement according to the invention.
Figure 3:
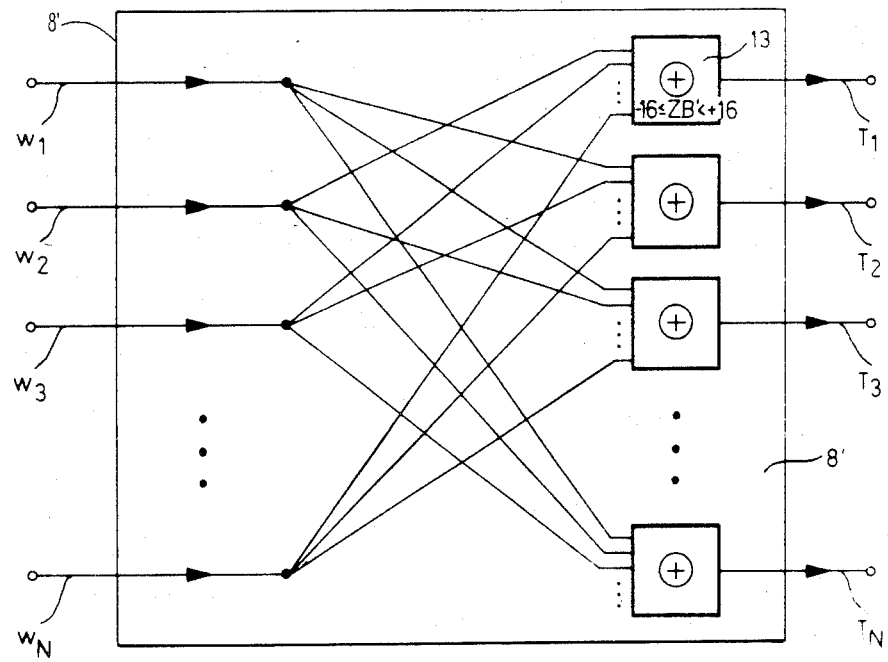
FIG. 3 shows a processing circuit for use in the second embodiment in accordance with FIG. 2.

In the second embodiment shown in FIG. 2 partial sums $T_n(k)$ are formed by sum formation with the aid of a processing circuit 8', for which adders 13 having an extended numerical range ZB' are used, to prevent overflow of the partial sums $T_n(k)$ (see FIG. 3). To simplify the description the parameter k will be omitted hereinafter. If, for example for encoding the subscriber signals 12 bits are available for a standardized numerical range $-1 \leq ZB < +1$, then when 16-bit adders (that is to say a standardized numerical range $-16 \leq ZB' < +16$) are used, at least 16 subscriber code words can be added together without the permissible (extended) numerical range ZB' being exceeded.

Before being transmitted to the subscriber, the partial sums $T_n$ must again be reduced to the original numerical range (in the example to $-1 \leq ZB \leq +1$). The easiest way to do this is limiting with the aid of limiter 17 before transmission (see FIG. 4). If the value of the partial sum $T_n$ is only little above the original numerical range ZB the limitation is hardly audible. If in contrast therewith the range is exceeded considerably (for example when more than two of the subscriber's speak simultaneously) the signals are adjusted to the original range by means of an additional attenuation control circuit 9'.

Figure 4:
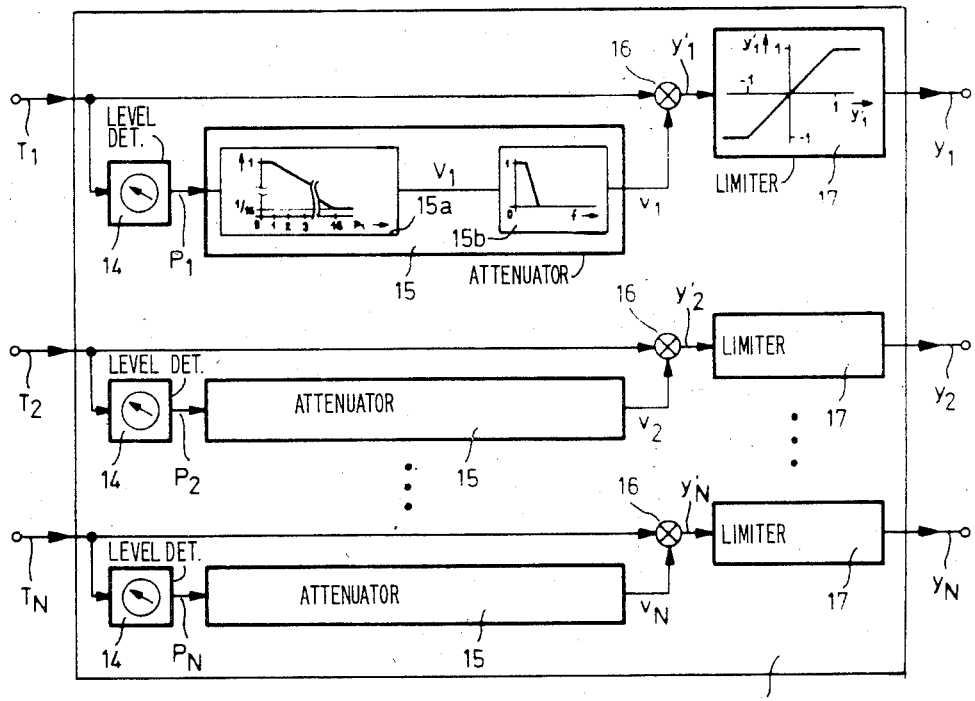
FIG. 4 shows an attenuation control circuit for the second embodiment in accordance with FIG. 2.

This may, for example, be effected in the way shown in FIG. 4:

Depending on the level $T_n$, measured by means of a second measuring device 14 incorporated in the attenuation level circuit 9', of the partial sums $T_n$ an attenuation factor $v_n = 1 \ldots N$ is formed. The partial sum $T_n$, multiplied by $v_n$ is applied to limiters 17.

Figure 7:
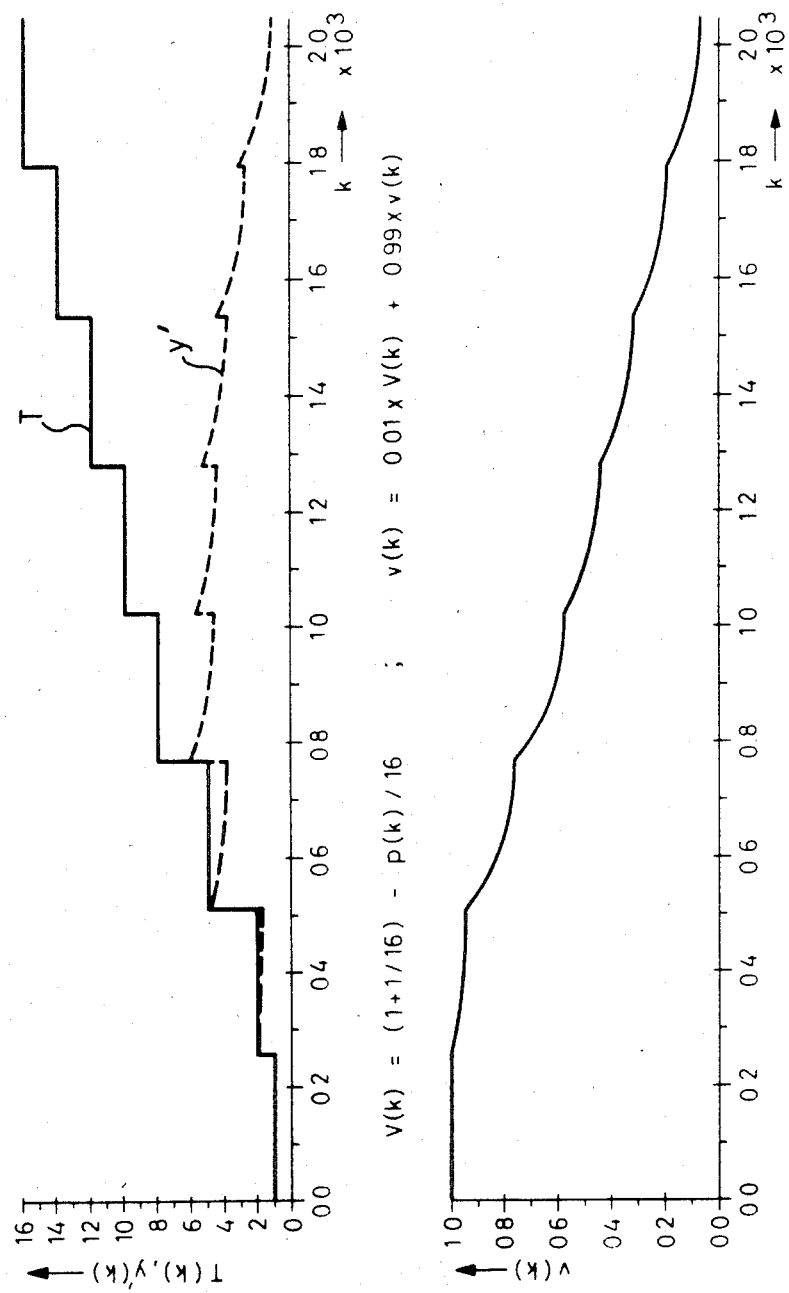
FIG. 7 shows the variations in the time of final sum-code word and smoothed attenuation factors when a first characteristic is used.
Figure 8:
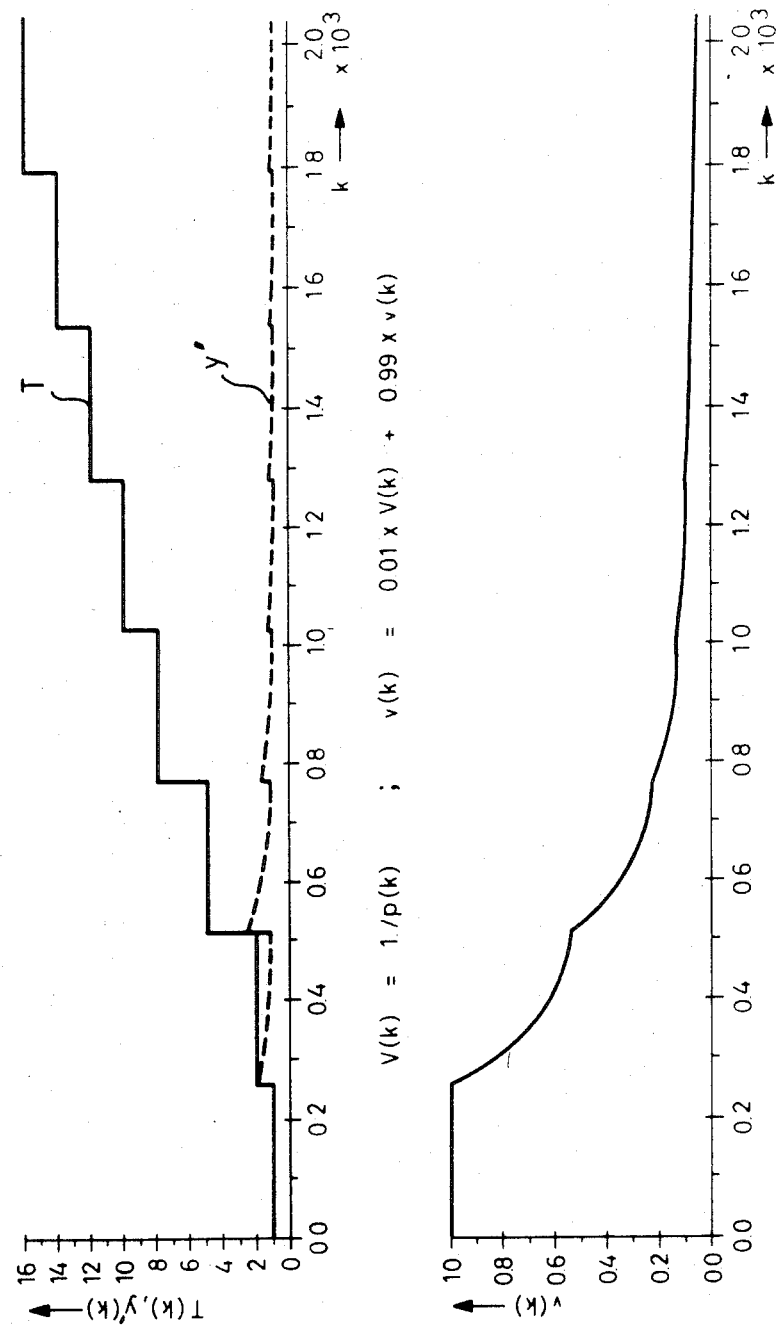
FIG. 8 shows the variation in the time of final sum-code words and smoothed attenuation factors when a second characteristic is used for the second embodiment in accordance with FIG. 2.

FIGS. 7 and 8 show the variation in the time of the final sum-code words $y'_n$ and the smoothed attenuation factor $v_n$. In converter 15a, which is included in the arrangement 15 and is, for example, in the form of a characteristics store, the level $p_n$ measured with the aid of the second measuring device 14 is assigned to the attenuation factor $v_n$. Assigning this level to the attenuation factor is effected for the attenuation factor $v_n$ shown in FIG. 1 in accordance with the stored characteristic $$V = 1; \text{ for } 0 \leq p_n \leq 1 \qquad (I)$$

$$a + b \cdot p_n; \text{ for } 1 < p_n$$

and for the attenuation factor $v_n$ shown in FIG. 8 in accordance with the stored characteristic $$V = 1; \text{ for } 0 \leq p_n \leq 1 \qquad (II)$$

$$\frac{1}{p_n}; \text{ for } 1 \leq p_n \leq 16$$

To smooth the attenuation factor $v_n$ thus obtained a low-pass filter 15b is provided subsequent to the converter 15a in the arrangement 15, the smoothed attenuation factor $v_n$ being taken from the output of this filter. The partial sum $T_n$ supplied by $v_n$ is applied to the limiters 17.

In a parallel-series converter 10 connected to the limiters 17, the final sum-code words $y_n$ to be transmitted are again inserted into the serial data stream and transmitted via the bus 12. Before transmission compressed encoding is effected in the converter 11.

Figure 5:
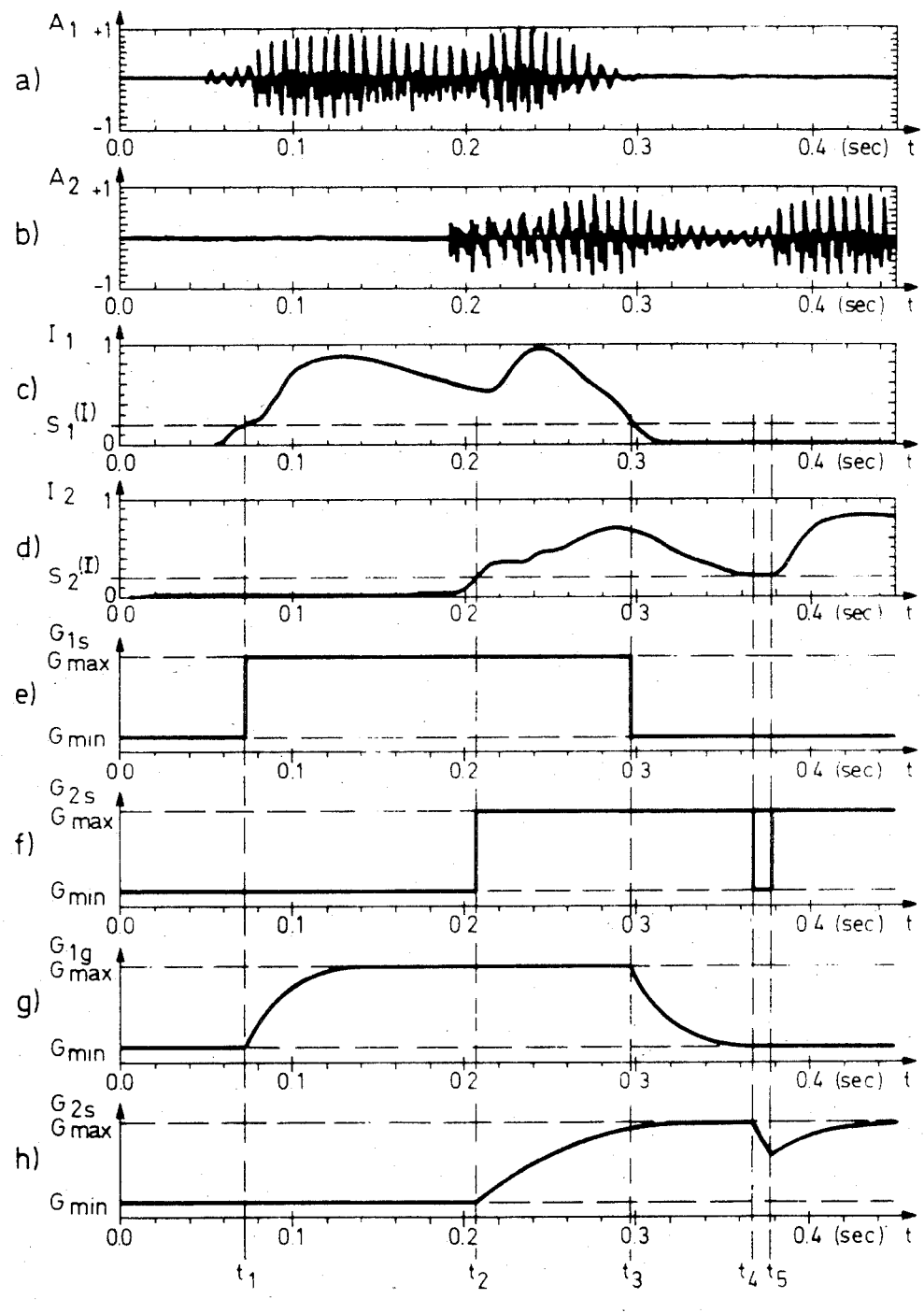
FIG. 5 shows the variations in the time of the speech signals, measuring values and weighting factors produced for the second embodiment in accordance with FIG. 2 and FIG. 6 for the first embodiment in accordance with FIG. 1.

Adjusting the weighting factors for the second embodiment shown in FIG. 2 will now be explained with reference to FIG. 5. The situation in which only one subscriber is speaking (instant $t_1$) is taken as the starting point. The speaking subscriber is interrupted during the conversation by another participant in the conference (instant $t_2$).

According to the invention, the incoming speech signals are attenuated depending on their intensity. For example, signals received from speaking conference participants (active speakers) are attenuated to a lesser extent than the signals received from silent participants (participants who are not speaking). Whether a conference participant is indeed speaking or whether he is currently not speaking can, for example, be determined with the aid of a power criterion.

FIG. 5a shows the variation with time of the speech signals of a first conference participant and FIG. 5b shows the variation with time of speech signal of a second conference participant. The FIGS. 5c and 5d illustrate the variation with time of the speech intensity of both subscribers. For that purpose, in this example the amplitude is formed from the speech signal of FIG. 5a (or FIG. 5b) and a smoothing operation is effected with the aid of a low-pass filter of the fourth degree. As soon as the speech intensity $I_1$ or $I_2$ of the two conference participants exceed a threshold $S_1(I)$ or $S_2(I)$ (instant $t_1$ or $t_2$, respectively) both conference participants are graded as being actually speaking. As will be obvious from FIG. 5e, a weighting factor $G_{1g}$ which does not exceed a maximum value $G_{1max}$ is assigned to the first conference participant in the time interval between the instants $t_1$ and $t_2$.

At instant $t_2$, the second conference participant is recognised as being actually speaking, as his intensity signal $I_2$ exceeds the threshold $S_2(I)$.

As soon as now the second conference participart is speaking (from instant $t_2$), his weighting factor is increased from $G_2^*$ to $G_{2max}$. The weighting factor $G_1$ of the first conference participant is reduced to $G_{1min}$ (see FIG. 5e and FIG. 5f) at $t_3$. The sudden change in the adjustment of the weighting factor $G_{1s}$ or $G_{2s}$ (shown in the respective FIGS. 5e and 5f) results in switching noise or annoying sudden changes in the sound level. This effect occurs frequently when during the course of the conversation the intensity signal $I_n$ briefly falls below the threshold $S_n(I)$ (for example in voiceless speech segments). As will be obvious from FIG. 5f, (at the instant $t_4$), the weighting factor $G_{2s}$ drops in such a situation to the minimal value $G_{2min}$. If on the contrary, adjustment of the weighting factor is effected smoothly, as shown by, for example, FIGS. 5g and 5h) such short interruptions in the gain are avoided to a very high extent.

If one wants to omit the attenuation control circuit 9' and extend the numerical range, then it must be ensured, by a corresponding adjustment of the weighting factors, that during the formation of the partial sums no overflow occurs. This is indeed obtained in the first embodiment as shown in FIG. 1.

Figure 6:
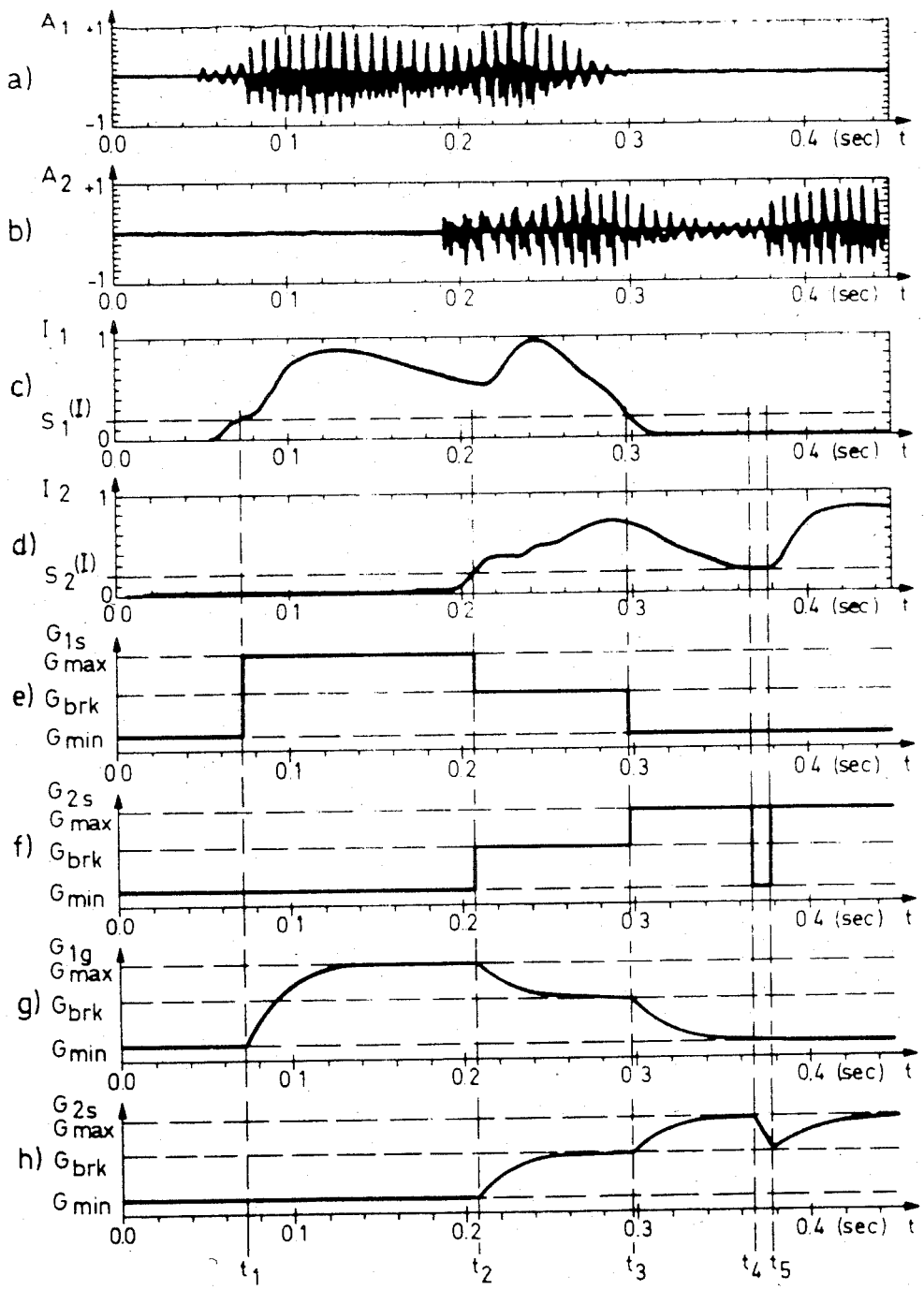

In FIG. 6a or 6b it can be seen that summing of the speech signal A1 and A2 may result in overflow of the numerical range (from instant $t_2$ onwards).

To prevent this, the weighting factor $G_1$ can be reduced from $G_{1max}$ to $G_{1brk}$ and the weighting factor $G_2$ increased from $G_{2min}$ to only $G_{2brk}$ (see FIG. 6e) and (FIG. 6f or FIG. 6g), respectively and (FIG. 6h).

What is claimed is:

1. A circuit arrangement for establishing conference connections in a PCM telephone switching system in which a data stream of delinearized code words representing speech samples of all of the conference participants during cyclically recurring pulse frames is transmitted to such participants, the delinearized code words for any pulse frame being formed by linearizing and summing the delinearized code words of the participants during the preceding pulse frame and delinearizing the sum-code word thus formed, such code words having a numerical range ZB; said circuit arrangement comprising:
   a plurality of speech level detectors to which the linearized code words of the participants are applied and which measure the speech intensities of such code words;
   a control circuit connected to the speech level detectors and responsive to the measured speech intensities of the linearized code words to produce weighting factors corresponding thereto;
   a plurality of multiplier circuits having first inputs to which the linearized code words are applied and second inputs to which said control circuit applies the corresponding weighting factors, such multiplier circuits being adapted to produce weighted participant code words ($w_n$) by multiplying the linearized code words by the corresponding weighting factors;
   and circuit means connected to the multiplier circuits for combining the weighted participant code words so as to form the respective partial sums ($y_n$) thereof, such partial sums respectively representing the sum of all weighted participant code words other than those of respective ones of the conference participants;
   the weighting factors produced by said control circuit and the combinations of weighted participant code words produced by said combining circuit means being such that the partial sums of the weighted participant code words all fall within a said numerical range ZB.

2. A conferencing circuit arrangement as claimed in claim 1, in which said combining circuit means comprises an adding circuit for forming the total sum of all the weighted participant code words and a plurality of subtracting circuits connected to said adding circuit and to said multiplier circuits for subtracting from such total sum the weighted participant code words of the respective participants, such subtraction producing the partial sums of the weighted participant code words; and in which the weighting factors produced by said control circuit are set so that all of the partial sums of the weighted participant code words fall within said numerical range ZB.

3. A conferencing circuit arrangement as claimed in claim 1, in which said combining circuit comprises an adding circuit for forming the respective partial sums ($T_n$) of the weighted participant code words over a numerical range which extends beyond said numerical range ZB so that there is no overflow of any of such partial sums, and an attenuation control circuit connected to said adding circuit and which, by applying attenuation factors ($v_n$) to such extended range partial sums, weights such extended range partial sums so that they all fall within said numerical range ZB.

4. A conferencing circuit arrangement as claimed in claim 3, wherein said attenuation control circuit comprises further speech level detectors for measuring the intensities of the extended range partial sums of each of the conference participants, attenuating circuits respectively connected to such further speech level detectors for deriving attenuation factors ($v_n$) corresponding to such measured intensities, and multipliers connected to said adding circuit and to respective ones of said attenuating circuits for multiplying the extended range partial sums by the corresponding attenuation factors; and further comprising limiters respectively connected to said multipliers for limiting the extended range partial sums so that they fall within said numerical range ZB.

5. A method of processing conference call speech signals in a switching system wherein during a first pulse frame compressed individual code words received from conference participants are linearized and stored, comprising the steps of
   measuring the speech intensity of each of said linearized individual code words;
   generating a weighting factor having a value varying in dependence on the so-measured speech intensity of each of said linearized individual code words;
   multiplying each of said linearized individual code words by the corresponding one of said weighting factors thereby creating weighted individual code words for each of the conference participants;

summing all of said weighted individual code words except the weighted individual code words of respective ones of said participants, thereby creating weighted partial sum code words;

and compressing each of said weighted partial sum code words and transmitting the so compressed partial sum code words to respective ones of said participants;

the weighting factors and the step of summing the weighted individual code words being related so that the compressed partial code words transmitted to said participants all fall within a predetermined numerical range ZB.

6. A method as set forth in claim 5 wherein the values of the weighted individual code words all fall within said predetermined numerical range ZB and said summing step comprises summing said weighted individual code words over a numerical range which is extended relative to said numerical range ZB, thereby creating a plurality of extended range partial sums; and further comprising:

measuring each of said partial sums and generating attenuation factors in accordance therewith;

multiplying each of said partial sums by the corresponding one of said attenuation factors thereby creating a plurality of weighted partial sums, and limiting each of said weighted partial sums to within said predetermined numerical range ZB; and transmitting the so formed limited sum code words to each of said participants.

7. A method as claimed in claim 6, wherein said weighting factors vary between a predetermined lower limit and a predetermined upper limit; and wherein said predetermined upper and lower limits are the same for each of said participants.

8. A method as set forth in claim 5, wherein said step of measuring said speech intensity comprises measuring the power content of said speech intensity.

9. A method as set forth in claim 7, wherein the same weighting factor is assigned to each speaking participant when a plurality of participants are evaluated as speaking.

10. A method as set forth in claim 5, wherein measuring said speech intensity constitutes measuring the amplitude of said speech intensity.

11. A method as set forth in claim 5, further comprising the step of evaluating each participant as actually speaking or silent on the basis of whether the measured speech intensity of such participant exceeds or is less than a predetermined threshold level, respectively.

12. A method as claimed in claim 11, wherein said thresholds do not fall to below a lower limit and do not exceed an upper limit.

13. A method as set forth in claim 11, wherein said predetermined threshold level for each participant in any time period is varied in dependence on the maximum speech intensity of such participant measured during a preceding time period.

14. A method as claimed in claim 13, wherein said threshold level of each conference participant in any time period is set in dependence on the average speech intensity of such participant measured during previous time periods.

15. A method as set forth in claim 11, wherein the weighting factor for each participant is increased when the speech intensity of such participant increases from below to above said threshold level.

16. A method as claimed in claim 15, wherein said increase or decrease of said weighting factor for each participant is non-linear with respect to time and varies in dependence upon the speech intensity of such participant during a preceding time period.

17. A method as claimed in claim 15, wherein the weighting factor of a participant already evaluated as speaking is decreased when the weighting factor of a second participant increases from below to above said threshold level.

18. A method as claimed in claim 17, wherein said weighting factor for each participant has upper and lower limits which are varied in dependence upon the measured speech intensity of such participant.

19. A method as claimed in claim 18, wherein said measured speech intensity of a participant is an average of the speech intensity of each participant over successive measuring periods.

20. A method as set forth in claim 11, wherein the weighting factor for each participant is decreased when the speech intensity of such participant decreases from above to below said threshold level.

21. A circuit arrangement for performing the method as claimed in claim 5, comprising: a code converter to which the data stream of delinearized code words of the conference participants is applied and which produces the corresponding linearized code words; a series-parallel converter (3) connected to said code converter and at whose outputs the linearized code words of the conference participants are respectively produced in successive pulse frames, each output of the series-parallel converter (3) being connected to a store (5) and to a measuring device (4) for measuring the speech intensity of the linearized code word at such output; a control arrangement (6) connected to said measuring devices and adapted to derive from the measured speech intensities corresponding adjusted numerical factors; a plurality of multipliers having first inputs connected to said stores and second inputs connected to said control arrangement, the output of each multiplier (7) being a weighted partial sum code word; the output of each multiplier (7) being connected to an adder circuit (8) and to a subtractor (9), weighted partial sum code words being produced at the outputs of such subtractors (9); a parallel-series converter (10) connected to the outputs of the subtractors and adapted to form a single data stream of all the weighted participant code words; and a further code converter (11) connected to the parallel-series converter (10) for compressing such single data stream.

* * * * *